June 27, 1967 E. G. PLATT ET AL 3,328,531

ALLOTTER WITH MONITOR CONTROL CIRCUIT

Filed Jan. 15, 1964 4 Sheets-Sheet 1

INVENTOR.
ERIC G. PLATT
WILLIAM K.C. YUAN

BY J. Warren Whitesel
ATTORNEY

ALLOTTER WITH MONITOR CONTROL CIRCUIT

Filed Jan. 15, 1964 4 Sheets-Sheet 4

United States Patent Office 3,328,531

Patented June 27, 1967

3,328,531

ALLOTTER WITH MONITOR CONTROL CIRCUIT

Eric G. Platt, Oak Lawn, and William Ke Chin Yuan, La Grange, Ill., assignors to International Telephone and Telegraph Corporation Filed Jan. 15, 1964, Ser. No. 337,865
17 Claims. (Cl. 179—18)

This invention relates in general to ring counters and to allotters. More particularly, it relates to ring counters especially—although not exclusively—adapted for use as allotters in telephone systems.

A "ring counter" is an endless circuit having many cascaded stages arranged so that only one stage may be "on" (or "off") at any given time. The stages are connected together in a ring or circle. That is, an output terminal from each stage is connected to an input terminal of the next succeeding stage in the ring or circle. The operation of a typical ring counter is characterized by an endless, stage-by-stage (or step-by-step), transfer of an "on" (or "off") condition around the ring or circle. Thus, at any given time, one stage stands in an "on" condition and prepares the next succeeding stage for operation. Upon the receipt of an input signal, the "on" stage turns "off," the prepared stage turns "on," and the next succeeding stage is prepared. Hence, each input signal causes the "on" (or "off") condition to transfer one stage or step around the endless circle.

The "on" (or "off") condition signals may have many uses, one of which is to trigger or enable other circuits in a given sequence. One example of this trigger operation is found in an "allotter" or "marker" which enables a switch path to be extended through a telephone system. Since this device is common to all switch paths, no calls can be completed through the system if it fails. Hence, it obviously must be extremely reliable. Such a device is found in a co-pending application entitled. "Ring Counter and Marker," Ser. No. 183,859, filed Mar. 30, 1962, (now U.S. Patent 3,200,204), by W. K. C. Yuan and assigned to the assignee of this invention. That application covers a PNPN diode ring counter used as a marker or allotter in a telephone system. While both the allotter of that co-pending application and the telephone system in which it is used function well, the circuits disclosed therein have required a relatively large number of components since they require a triple redundancy to provide an alarm and transfer feature.

Accordingly, an object of this invention is to provide new and improved ring counters. A more specific object is to provide ring counters especially—although not exclusively—adapted for use as allotters or markers in electronic switching telephone systems.

Another object is to provide simple, low cost, easily manufactured ring counters. Here, an object is to reduce the number of circuit elements required for each ring counter stage. In this connection, an object is to provide ring counters which use a minimum number of components without in any way sacrificing circuit reliability. Quite the contrary, an object is to provide an alarm and transfer to a standby unit if a failure is detected.

In accordance with one aspect of this invention, a ring counter is arranged to step endlessly around a circle of cascaded switching stages. On each step, the ring counter provides an output voltage signal for enabling a particular circuit to operate. Logic circuitry is connected to the output of the ring counter for monitoring and analyzing the sequence of the output signals and for detecting non-sequential or uncoordinated operations which indicate a failure. An alarm and transfer occurs when such a failure occurs.

To improve reliability, an allotter is arranged to enable various circuits in a sequence which is such that no one circuit may be reassigned to operate until after an effort has been made to assign at least a predetermined minimum number of other similar circuits. Thus, a single defective circuit may not be assigned and reassigned while other non-defective circuits stand uselessly idle.

This improved reliability may be accomplished in either of two ways. First, the allotter may assign or enable similar circuits by groups in a primary order of service. The circuits in the enabled group then assign themselves at random to provide a sub-order of service. Each of the groups must have an opportunity to enable at least one circuit before the allotter may return to enable a group for a second time. Second, a multi-step chain circuit may be provided to attenuate a control of enabling marking signal. Since the potential of this signal is attenuated by an incremental amount at each step in the chain, circuitry may be provided to give an order of choice according to the potential of the signal as it appears at each step in the chain. That is, the circuit is allotted at the step where there is a coincidence between the highest potential enabling signal and an available circuit. If the first preference circuit is not available, a second preference circuit is allotted at the next step where the enable signal has the next to highest potential. In like manner, the enable signal is always applied to a predetermined number of circuits with a fixed order of preference. Thus, in both of these allotters, each time the allotter enables a circuit to operate, it enables a predetermined minimum number of circuits so that no defective circuit can be assigned a second time or reassigned endlessly to make the entire system inoperative.

The above mentioned and other features of the invention and the manner of obtaining them will become more apparent, and the invention itself will be best understood by reference to the following description of an embodiment of the invention taken in conjunction with the accompanying drawings, in which.

Figure 1:
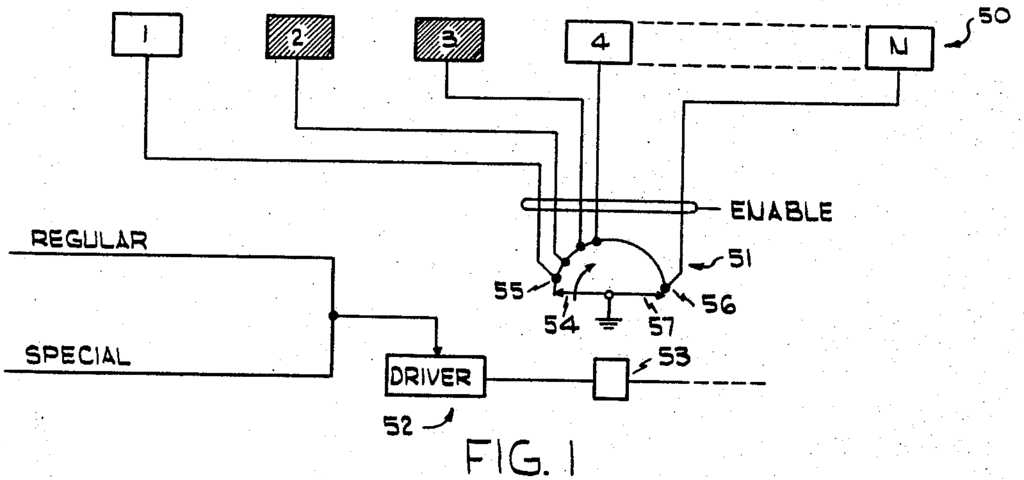
FIG. 1 is a block diagram which broadly shows an allotter function to illustrate a use to which the invention may be put.

The diagram, FIG. 1 broadly shows the functions of an allotter. The principal elements of this diagram are a plurality of circuits 50 which are to be allotted or enabled one-at-a-time in a given sequence, an allotter 51 for enabling the circuits, and a control circuit 52 for driving the allotter. For purposes of illustration only, the allotter 51 is here shown as an electromechanical switch that is driven one step at a time by a drive mechanism 53. This switch is driven responsive to either a regular demand for service or an occurrence of a special event which requires service.

When enabled, the circuits 50 may perform any desired function. The important thing is not what the circuit does after it is enabled, but that each circuit is enabled, one-at-a-time, in a predetermined sequence which either distributes wear equally between the circuits or performs work in a better manner. Symbolically, the sequence is here given by the order in which the circuits are shown in FIG. 1 (i.e., when idle, the circuits are individually assigned in the order "1, 2, 3 . . . N, 1, 2", etc., extending from left to right across FIG. 1). The shaded blocks are assumed to be busy so that they cannot be taken to perform a function when they are enabled. Therefore, with the circuits in the condition shown in FIG. 1, the order of asignment is "1, 4 . . . N, 1, 4" etc. (i.e., the allotter skips the busy circuits). If, for example, busy circuit 2 becomes idle, the order of assignment changes to "1, 2, 4 . . . N, 1, 2" etc.

The allotter 51 is here depicted as an electromechanical switch that steps over its associated terminals in the desired order of assignment. The circuit 1 is enabled when a brush 54 applies a ground potential to a terminal 55. By inspection, it should, therefore, be apparent that this switch is, in effect, a ring counter which individually enables every one of the circuits 50 in sequence around an endless circle. That is, the brush 54 steps over each terminal from a start position 55 where the circuit 1 is enabled to an end position 56 where the circuit N is enabled. After the last step, the brush 54 leaves the terminal 56, the brush 57 engages the first terminal 55, the circuit 1 is enabled, and the cycle repeats.

Figure 2:
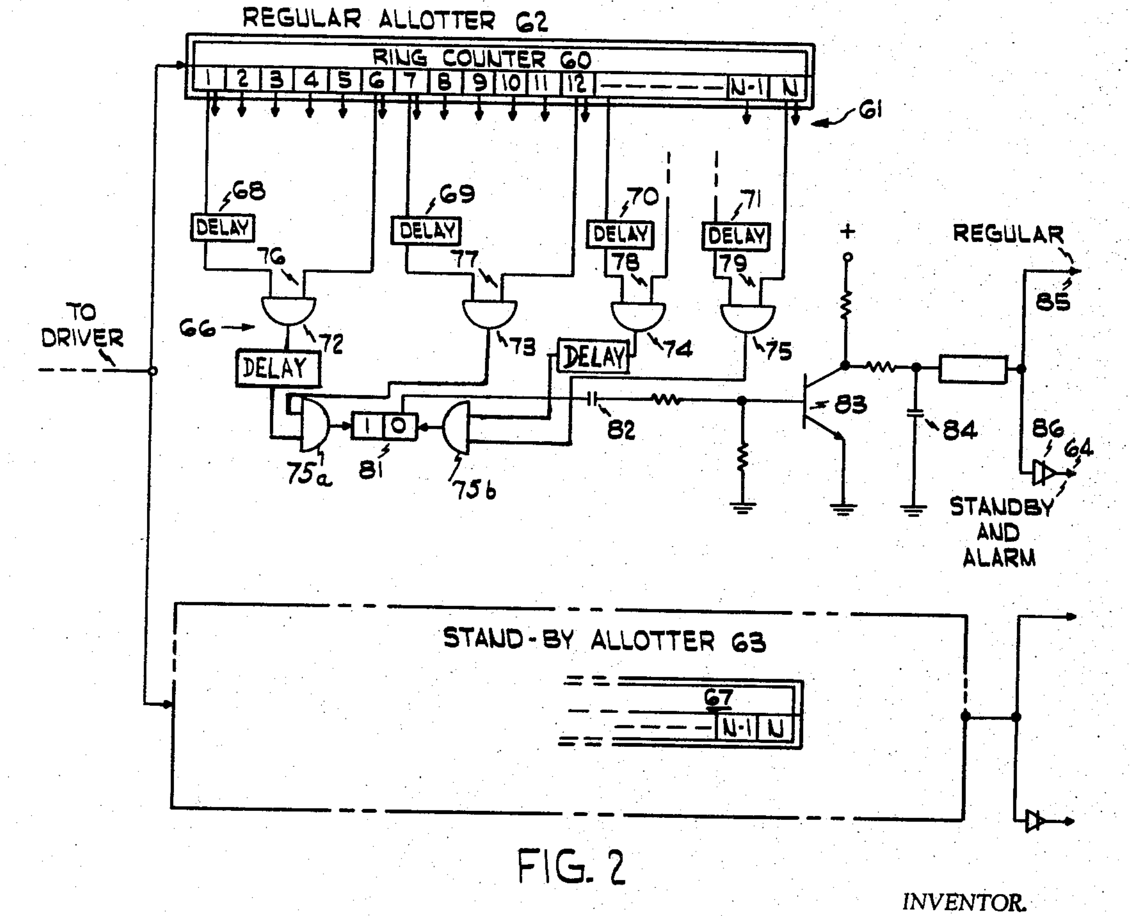
FIG. 2 is a logic diagram showing how the output of a ring counter may be monitored to detect non-sequential or uncoordinated output signals.

An electronic allotter is shown in FIG. 2 as comprising a ring counter having output terminals with fault detecting logic circuitry connected thereto. The ring counter 60 is arranged to step endlessly around a circle or cascade of switching stages (in the order of "1, 2, 3 . . . N—1, N, 1, 2 . . . "). On each step, the ring counter provides an output voltage signal at a corresponding one of the terminals 61 for enabling the operation of a circuit which is then demanding service. This output signal could be either an "on" or an "off" condition, depending upon circuit needs; therefore, we might generally call it a "particular" condition. Thus, the circuit of FIG. 2 provides the function shown by the block diagram of FIG. 1.

To increase reliability, identical regular 62 and standby 63 allotters are provided. Normally, allotter 62 operates and allotter 63 is inhibited. If the regular allotter 62 should fail, an alarm is given at 64, standby allotter 63 is started, and the output circuits 61 are transferred to come under the control of the standby allotter circuit 63. Thus, the problem is one of detecting a failure and causing the alarm and transfer.

To provide for a fault detection, the output of the regular allotter 62 is connected to logic circuitry 66 which monitors and analyzes the sequence of the output signals emanating from the ring counter 60. The alarm and transfer occurs when the logic circuitry detects that the monitored signals do not occur in the proper time coordination or sequence. These and other failures are called "unco-ordinated" operations of the ring counter.

In greater detail, each ring counter 60, 67 has any number (N) of stages divided into groups of any convenient size. Preferably, all of the groups are of equal size; however, this is not essential. The first stage in each group is connected via a delay device 68, 69, 70, 71 to an input terminal of a two input AND circuit 72, 73, 74, 75. The last stage in each group is connected to the other input terminal 76, 77, 78, 79 of the AND circuits 72–75. The delay devices 68–71 measure periods of time which exactly equal the time normally required by a non-faulty ring counter to step from the first stage of a group to the last stage of the same group. Hence, the AND gate 72, for example, conducts only if the ring counter 60 steps over the group of stage "1" through "6" during the exact length of time that is measured by the delay circuit 68. In a similar manner, the AND gate 73 conducts only if the ring counter steps over the second group 7–12 during the exact length of time that is measured by delay circuit 69. The conductors 76, 77, 78, 79 indicate that the output of all of the remaining stages of the ring counter are connected to be monitored in a similar manner.

The AND circuits 72–75 are connected in a similar manner through delay circuits to other AND circuits 75a, 75b which conduct only if the gates 72–75 conduct in a correctly timed sequence. The flip-flop 81 is driven by the outputs of the gates 75a, 75b. Thus, the output of AND gate 75a switches it to its "1" state, the output of AND gate 75b switches it to its "0" state, etc.

Whenever the flip-flop 81 reaches its "0" state, a capacitor 82 charges (or discharges) to turn "on" (or "off") the transistor 83. The result is that a pulsating DC current flows through the transistor 83 and is integrated and smoothed by a filter capacitor 84. Thus, as long as the ring counter 60 functions correctly, a regular allotter enable signal is applied to the REGULAR output terminal 85 to cause the allotter 62 to operate. This same signal holds an inverter 86 "off" to inhibit and thereby disable the standby allotter 63.

Suppose now that an uncoordinated fault condition occurs in the regular allotter 62. For example, assume that stage 3 of the ring counter 60 does not turn "on" promptly, and this delays the output of stage 6. If such delay in the stage 6 output exceeds a given tolerance amount of time, the input signal at the left-hand (as viewed in FIG. 2) input of the AND gate 72 disappears before the signal at the right-hand input 76 appears. The AND gate 72 does not conduct, and the flip-flop 81 remains on its "0" side. If the ring counter 60 either skips or turns "on" stage 3 too fast, the output of the stage 6 will appear sooner than it should. Thus, the signal at the left-hand input of AND gate 72 does not appear until after the stage 6 output signal has disappeared from the right-hand input of the AND gate 76. Since the AND gate 72 does not conduct, the flip-flop 81 does not change state when it should. This means that the capacitor 82 charges sufficiently to cause the transistor 83 to either switch "off" or to remain "off" (or the transistor 83 switches "on" and remains "on", depending upon the circuit design). When this occurs, the enabling signal disappears from the REGULAR allotter enable circuit output terminal 85. The inverter 86 turns "on" and the STANDBY AND ALARM terminal 64 is energized. This causes the standby allotter 63 to go into operation.

It is, of course, possible that a faulty ring counter might cause the AND gates 72–75 to conduct when they should not conduct, as for example where stage 3 is slow and stage 4 is fast with a completely compensating error. However, it is statistically unlikely that an exactly compensating error will occur. Moreover, if a circuit is faulty, it is even more unlikely that it will continue to produce exactly compensating errors indefinitely; more likely it will operate irregularly and almost immediately lose the error compensating synchronism. Thus, it is almost certain that the circuit will become uncoordinated, and a fault will be detected either at once or within a very few cycles of ring counter operations. At electronic speeds, this is an adequate detection period.

Economical advantages grow out of the described arrangement since both allotter units 62, 63 are identical. Therefore, a single type of printed circuit card may be used to provide both the regular and the standby allotter functions.

Means are provided to enable various circuits in a sequence which is such that no one circuit may be twice enabled to serve a demand until after an effort has been made to enable at least a minimum number of other similar circuits. Thus, a single defective circuit may not be enabled and re-enabled while other non-defective circuits stand uselessly idle. The invention contemplates two ways of accomplishing this end.

Figure 3:
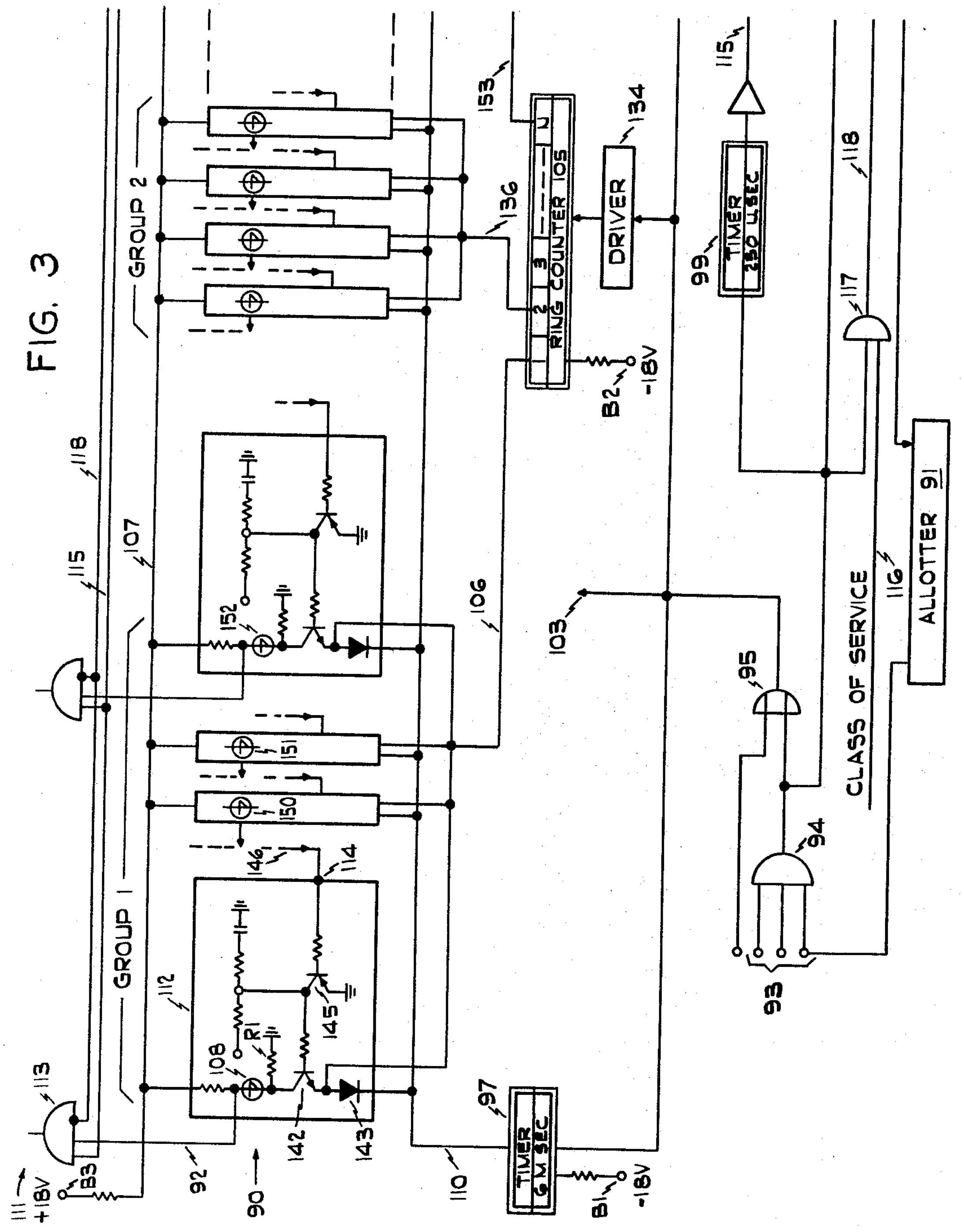
FIGS. 3 and 4 show how reliability may be increased through the use of an allotter for enabling circuits by groups.
Figures 4, 5, 6:
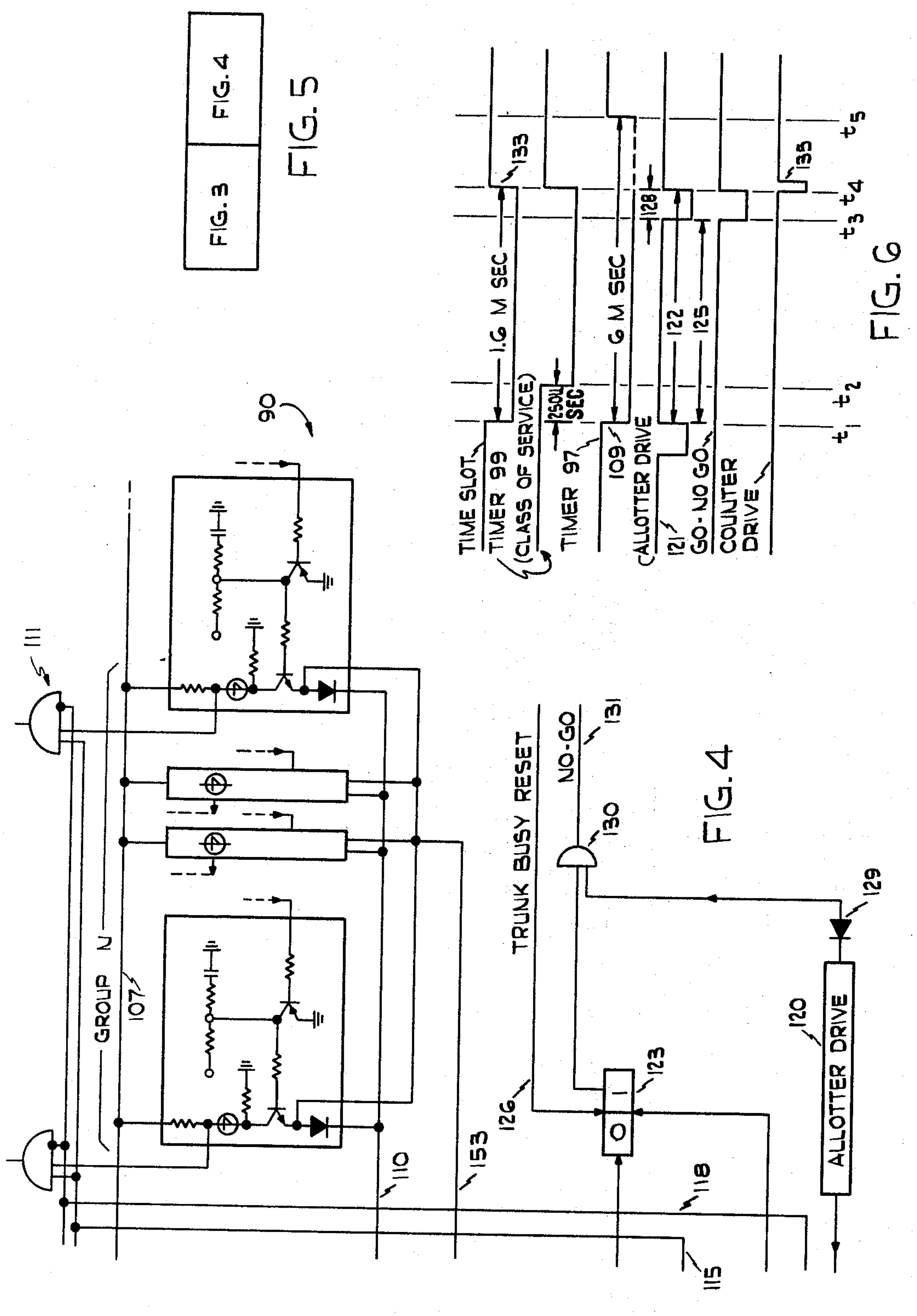
FIG. 5 shows how FIGS. 3 and 4 should be joined to provide a complete and understandable circuit.
FIG. 6 is a series of voltage wave forms showing the timing of circuit operations in FIGS. 3 and 4.

The principle of the circuit of FIGS. 3, 4 is that the allotter may enable or assign similar circuits, by groups, in a primary order of service. The circuits in the enabled group then assign themselves at random to provide a sub-order of service. This way, at least one circuit must be allotted in each of the groups before the allotter returns to allot another circuit in the same group.

Here the circuits 90 which are to be enabled by the allotter are shown near the top of the drawings (FIGS. 3, 4—when joined as shown in FIG. 5). These circuits are divided into "N" number of groups. Each of the groups may or may not contain an equal number of circuits. Some of the circuits 90 are here shown in detail, and others here are shown by blocks; however, it should be understood that all are identical. The allotter described above in connection with FIGS. 1 and 2 is shown at 91. The remaining components of FIGS. 3 and 4 are logic elements which will be understood best from a description of how the circuit operates.

Various time interval relationships, which are important to an understanding of the invention, are shown in FIG. 6. The time interval $t_1$–$t_4$—called the time slot—occurs when the allotter 91 allots the circuitry of FIGS. 3, 4. Of course, an occurrence of this time slot may signify any desired function. However, so that a concrete illustration may be given, it is assumed that the function is an extension of a trunk call through a telephone exchange. To further the concreteness of the illustration, it may be assumed that the circuit of FIGS. 3, 4 is the trunk allotter of a co-pending application (of which we are co-inventors) entitled "Electronic Switching Telephone System," Serial No. 320,363, filed Oct. 31, 1963, and assigned to the assignee of this invention.

When turned "on," each of the circuits 90 enables an individually associated one of many trunk circuits during an identifying time slot $t_1$–$t_4$ (FIG. 6). The enabling of a trunk circuit occurs when a marking appears on an output conductor such as 92, for example. Thus, it follows that the function of the circuitry of FIGS. 3, 4 is primarily to select one of many trunk circuits. Let us see how this is done.

A regular demand for service causes an energization of the upper two of the three inputs 93 of an AND gate 94. During the time slot which allows a trunk call to be extended, allotter 91 energizes the lower-most of the inputs 93, and the AND gate 94 conducts. Both AND circuit 94 and OR circuit 95 conduct to produce a drive pulse which lasts for the duration of the time slot. At the time $t_1$ (FIG. 6), the leading edge of this drive pulse turns "off" a timer 97 (FIG. 3) for a period of six milliseconds to provide enough time to enable the allotter circuit to operate. Also at time $t_1$, the drive pulse output of AND circuit 94 turns "on" a timer 99 which measures a period of 250 microseconds. Finally, the drive pulse energizes a terminal 103 to perform any function which is preliminary to the operation of the trunk alloter of FIGS. 3, 4. For example, in our co-pendnig application, the signal at terminal 103 drops a junctor circuit.

The circuit of FIGS. 3 and 4 first makes an attempt to enable one circuit in a particular group of the circuits 90. The group is selected by a ring counter 105; the circuit selects itself. For example, if it is assumed that the ring counter 105 stood on its stage 1 before time $t_1$, the circuits of group 1 are enabled via a group enable conductor 106 during the period $t_1$–$t_4$. If none of the circuits 90 are "on," the potential difference across the busses 106, 107 is such that one of many electronic breakdown devices (such as a PNPN diode 108) connected between these two busses turns "on." This happens at random. Then, the potential difference between the busses 106–107 virtually disappears, and no other one of the break down devices may turn "on."

This is what happens at time $t_1$. As shown at 109 (FIG. 6), the timer 97 (FIG. 3) removes the (−)18 volts of battery B1 from a common enabling conductor 110 to remove an enabling voltage required by all of the circuits 90. If the ring counter 105 stands on its stage 1, for example, another (−18 volts are applied from battery B2 over the group enabling conductor 106 to enable any circuit in group 1 to operate. This causes a randomly selected idle one of the circuits 90 in group 1 to turn "on" and prepare an AND circuit in a group of AND circuits 111. When it switches "on," the selected circuit prevents any other enabled circuit from also switching "on." For example, if diode 108 switches "on," circuit 112 is alloted, the AND circuit 113 is prepared, and circuit 112 is latched in an "on" condition responsive to a signal appearing at terminal 114.

At time $t_2$ (FIG. 6), the timer 99 (FIG. 3) times out and applies a voltage to conductor 115 for energizing a second input of all of the AND circuits in group 111. At this point in time, either of two assumptions can be made. The first assumption is that the requested function is not allowed to the requesting circuit. For example, in our co-pending application, a calling subscriber may not be allowed to make a trunk call. If this is the case, a class of service marking appears on conductor 116. When the AND gate 94 conducts, there is a coincidence at the input of the AND gate 117 which also conducts to mark conductor 118 for inhibiting all of the AND circuit 111. Nothing further happens when this inhibit marking is present. Under the second assumption, the subscriber is allowed to make a trunk call. With this assumption, the conductor 116 is not marked at the time when the timer 99 energizes the conductor 115. The AND gate 117 does not conduct, and the AND gates 111 are not inhibited. Therefore, the enabled AND gate 113 conducts. Thus, it is seen that the time period $t_1$–$t_4$ is long enough to time for a recognization of a class of service marking on conductor 116.

A "go," "no-go" decision occurs during the time period $t_3$–$t_4$, depending upon whether the enabled circuit does or does not complete all of its required functions. In greater detail, the allotter 91 is driven responsive to the output of an asymmetrical multivibrator 120 having an output voltage which changes with a wave form as shown at 121 (FIG. 6). The 1.6 millisecond time slot lasts for an entire pulse period 122 in the output of the driver 120 (FIG. 4). When the AND gate 94 conducts at the start of a time slot ($t_1$), a flip-flip 123 is set to its "1" side. The attempted allotting function occurs during the relatively long ($t_1$–$t_3$) first portion 125 of the pulse period. If a circuit is successfully allotted, it will reply by applying a signal to the conductor 126 and resetting the flip-flip 123 to its "0" side. This is a "go" decision signal. If a circuit is not successfully allotted during the period $t_1$–$t_3$, no signal will appear on conductor 126 and the flip-flip 123 is not reset; it remains in its "1" state. As symbolically shown by the diode 129, the relatively short ($t_3$–$t_4$) last portion 128 of the allotter drive pulse period, has a polarity which energizes AND gate 130. Thus, there is a coincidence between the negative polarity pulse 128 and the signal from the "1" side of the flip-flip 123, and AND gate 130 conducts. This marks a NO-GO conductor 131. Any appropriate action is now taken responsive to this "no-go" decision signal. For example, in our co-pending application, a call connection is returned to the junctor which was dropped when the terminal 103 was marked.

The ring counter 105 is stepped at the end of a time slot. That is, on the trailing edge 133 (FIG. 6) of the time slot ($t_4$), the driver circuit 134 (FIG. 3) generates a pulse 135. This pulse drives the counter 105 one step. Under the assumed conditions where the ring counter previously rested on its step "1," a (−) 18 volt potential is removed from the group enabling conductor 106 and applied to another group enabling conductor 136. If a circuit in group 1 has already turned "on," the potential on bus 107 prevents a circuit in group 2 from turning "on." On the other hand, if no circuit has turned "on" in group 1, a circuit now tries to turn "on" in group 2 because of the potential appearing on bus 107. If a circuit now turns "on" in group 2, it prepares an AND circuit (not shown) in the circuits 111, latches itself in an "on" condition, and lowers the potential on bus 107 to prevent any other circuit from turning "on."

When the timer 97 times out at time $t_5$ (FIG. 6), it puts the (−) 18 volt potential of battery B1 on a common enabling conductor 110 to enable everyone of the circuits 90. If any circuit has turned "on" and latched, the potential on bus 107 is lowered so that nothing further happens. On the other hand, if none of the circuits 90 has turned "on," the potential on bus 107 remains high so that every one of the circuits 90 now tries to turn "on." The first of the circuits 90 to succeed in turning "on" seizes control, latches, and lowers the potential on bus 107 to bar the other circuits from turning "on." For example, suppose that all of the circuits 90 in groups 1 and 2 are busy. None can turn "on." The pulse 135 drives ring counter 105 to its step 2, and nothing happens. At time $t_5$, when the common enabling bus 110 is energized, the potential difference across the busses 110, 107 is such that an idle one of the PNPN diodes, such as 108, must turn "on." Then any idle one of the circuits 90 turns "on" and lowers the potential on bus 107 to prevent the other circuits from operating.

An advantage of this arrangement is that traffic must be distributed over all groups before any circuit may be enabled for a second time. Therefore, a single faulty circuit cannot cause a failure of the entire system. This advantage can best be understood from a description of how an exemplary one of the circuits 90 functions. All of them are identical.

Each of the circuits 90 comprises an electronic breakdown device, here shown as a PNPN diode (such as 108), connected between the common control busses 107, 110 and between the common bus 107 and a group enable bus such as 106. In series with each PNPN diode is an electronic switch here shown as an NPN transistor (such as 142). The various resistors bias the transistor 142 to operate as a normally closed D.C. switch. Resistor R1 is a high resistance load for the collector of transistor 142 and for the PNPN diode 108. All of the electronic switches, such as 108, are connected to the common control bus 110, but they are isolated from each other by diodes, such as 143.

A PNP transistor 145 is connected to the base of the switch transistor 142 and acts as a control for the D.C. switching function. For example, when the associated equipment which is enabled via the AND gate 113 is idle, it marks the conductor 146 and terminal 114 in a manner which results in a closure of the D.C. switch 142. When the associated equipment is busy, it marks conductor 146 to open the D.C. switch.

Assume that all circuits associated with group 1 are idle and that all of the PNPN diodes 108, 150, 151, 152 are "off." All of the D.C. switches (such as 142) are closed. Further, assume that the ring counter 105 last stood on its stage N, and that the drive pulse 135 occurs to drive the ring counter to its stage 1. The timer 97 is "off," and bus 110 is de-energized.

When stage 1 of ring counter 105 turns "on," a (−) 18 volt potential is applied from battery B2 to the group enable bus 106. With this (−) 18 volt battery connected to the group bus 106 and the (+) 18 volt battery B3 connected to common bus 107, a total of 36 volts are applied across each of the PNPN diode 108, 150, 151, 152. The group busses 136, 153 are not marked; therefore, no potential is applied across the PNPN diodes in GROUPS 2 through N. All of the diodes (108, 150, 151, 152) in GROUP 1—and only the diodes in GROUP 1—try to turn "on." However, almost certainly, one of the PNPN diodes will fire before the others due to the probability that no two diodes will have identical firing characteristics.

Before a diode fires, the potential on the common bus 107 stands at approximately (+) 18 volts of battery B3. After a diode fires, the potential on bus 107 moves toward the (−) 18 volts of battery B2 (there will be approximately ground potential on bus 107 at this time). When this occurs, the unfired ones of the diodes 108, 150–152 cannot fire. Hence, one and only one of the diodes connected between the busses 106, 107 can fire at any given time. As soon as the PNPN diode fires, the potential of the battery B2 (less the miscellaneous IR drops) appears on an output bus. For example, if diode 108 fires, the potential of the battery B2 appears on the output conductor 92. Later, during the time slot period (between times $t_2$–$t_3$), there is a coincidence with the output of timer 99, and the AND gate 113 conducts if it is not inhibited because of a class of service potential on the conductor 116. This output of the AND gate 113 enables the associated circuit which is connected thereto.

Responsive to its seizure, the associated circuit marks the conductors 126 and 146. The signal on conductor 126 indicates a "go" decision and returns the flip-flip 123 to its "0" side. The signal on conductor 146 turns "off" the D.C. switch 142. The circuit 112 is now described as "latched" because the diode 108 may not be fired again as long as the potential remains on conductor 146 for holding the switch 142 open. The next time that the group bus 106 is marked, one of the diodes 150–152 can fire because their switches (which correspond to the switch 142) are now closed.

To understand how the FIGS. 3 and 4 circuit provides a greater reliability, consider an example where the diode 108 has characteristics which makes it the first to fire. That is, it fires when the potential across the busses 106, 107 is too low to fire any other of the PNPN diodes. Assume that the circuit enabled by the AND gate 113 is defective. Also assume that the circuits 90 are switched "off" and "on" responsive to the output of the timer 97 and that the ring counter 105 and group allotting are not provided. Finally, assume that it is a low traffic density period of the day, such as during the very early morning hours in a telephone exchange. Each time that the timer 97 turns "on," the diode 108 fires, and the defective circuit enabled via gate 113 fails to give service. Thus, anyone who is trying to make a call at this hour always runs into the same defective circuit, and this one defect makes the entire exhange fail.

With the invention, this failure cannot happen. Each group of the circuits 90 is enabled in a fixed sequence by the output of the ring counter 105. Therefore, at least one circuit in each of the "N" number of groups must be enabled before the allotter can return to enable another circuit in the same group. Thus, with the invention, the low firing potential PNPN diode cannot turn "on" except once in every "N" number of trails. A defective circuit will not be enabled and re-enabled while non-defective circuits stand uselessly idle.

Figure 7:
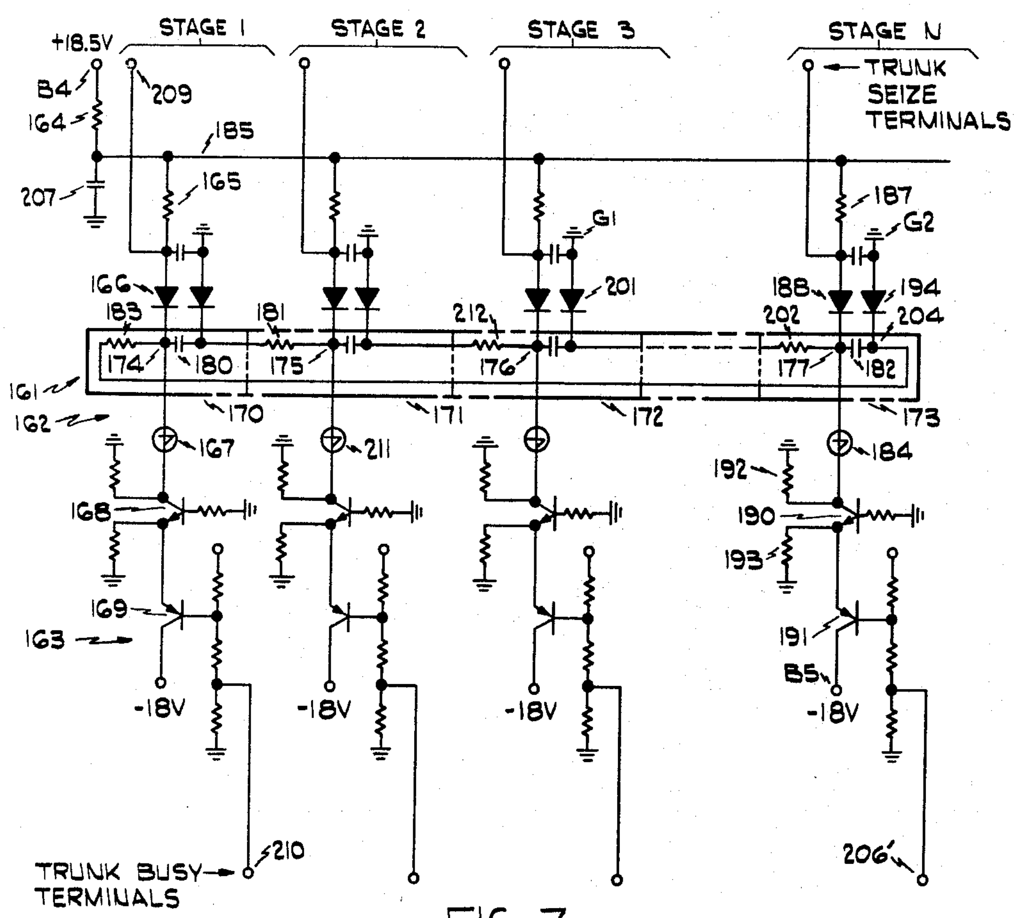
FIG. 7 shows how reliability may be increased by simultaneously enabling a given number of circuits in a predetermined order of preference.

A second enmbodiment of the invention which also prevents one defective circuit from seizing control over the entire system is shown in FIG. 7. Here a multi-step chain circuit is provided to attenuate a control of enabling signal which selects between the allotted circuits. That is, since the potential of this control signal is attenuated by an incremental amount at each step in the chain, circuitry may be provided to give an order of selection among the allotter stages, according to the potential appearing at each step.

Briefly, a circuit is allotted at the step where there is a coincidence between an idle circuit to be enabled and a control of enable signal with a potential which is higher than the potential at any other idle one of the circuits which is to be enabled. Thus, if the circuit is busy where the potential is the highest that circuit is not available, and another circuit is allotted at the step where the control of enable signal potential is next to highest—assuming that it is available. In this manner, the control of enable signal is always applied to a minimum number of circuits with a selection in a given order of preference so that no defective circuit can make the system totally inoperative.

FIG. 7 shows a PNPN diode, ring counter used to allot an idle one of many external circuits (not shown), such as trunk circuits, for example. Each of these external circuits is individually connected to an associated one of the terminals at the top of FIG. 7 marked "TRUNK SEIZE TERMINALS." When an external circuit is seized, it returns a signal over an associated one of the terminals at the bottom of FIG. 7 marked "TRUNK BUSY TERMINALS."

The allotter of FIG. 7 comprises a multi-step chain circuit 161, a series of bistable switching devices 162, here shown as (PNPN diodes), and a series of electronic switches 163. Normally, all except one of the PNPN diodes are "off." Responsive to the operation of the circuit allotted by the diode that is "on," the ring counter takes one step. The "on" diode turns "off," and the next succeeding diode normally turns "on" to allot the next succeeding circuit.

In greater detail, all of the ring counter stages are identical; each includes a voltage divider having a bistable electronic device in at least one arm thereof. Consider STAGE 1, by way of example. The voltage divider may be traced from a (+) 18.5 v. battery B4 through resistors 164, 165, diode 166, PNPN diode 167, and transistors 168, 169 to a (—) 18 v. battery. It is not important whether the ring counter starts on any particular stage when battery is first applied to the circuit.

To arrange the counter stages in a ring or circle, a capacitive and resistive coupling connects a potential point on the voltage divider of each counter stage to another potential point on the voltage divider in the next following stage. That is STAGE 2 is the stage next following STAGE 1. In a similar manner, STAGES 2 through N follow each other endlessly in numerical order. Thus, the STAGE 1 is the stage next following STAGE N, thereby completing the ring or circle.

According to the invention, the chain circuit 161 attenuates a control of enable signals by an incremental amount at every step in the chain. More particularly, an exemplary four of "N" number of steps are identified in FIG. 7 by the reference numerals 170, 171, 172, 173. If, by way of example, a (—) 18 volt control of enable signal appears at point 174, it might be attenuated to become (—) 14 volts at point 175 and (—) 10 volts at point 176. These voltages of (—) 18, (—) 14, and (—) 10 are purely hypothetical—any convenient values may be used. The point is that each of the PNPN diodes is primed to a different firing voltage.

The first stage in the ring counter is linked to the second stage via a capacitor 180 and resistor 181 which connect the points 174, 175. Similar capacitors and resistors couple together the STAGES 2 through N in numerical order. The capacitor-resistor combination 182, 183 couples potential point 177 in STAGE N to potential point 174 in STAGE 1, thus completing the ring or circle.

The operation of the circuit is best explained by assuming specific voltages at specific points in the circuit. While efforts are made to assume voltages which might reasonably be expected, the values are approximate and no special significance should be attached thereto. Also, all stages of the counter are the same; therefore, an assumption may be made that the PNPN diode in any one of them is conducting at any given time. Since the relation between Stages N and 1 may be a little more difficult to visualize, an assumption is here made that PNPN diode 184 in STAGE N is conducting.

Current flows from the (+) 18.5 v. battery B4 over bus 185 and through resistor 187, diodes 188, 184 and transistors 190, 191 to a (—) 18 v. battery B5. The resistors 192, 193 bias and load the transistors 190, 191 with no significant effect upon the potential at the point 177. Thus, the IR voltage drops across the transistors 191, 190 and PNPN diode 184 cause slightly less than the (—) 18 volts potential of the battery B5 to appear at point 177. A ground potential G2, less the IR voltage drop across the diode 194, causes a charge of approximately 18 volts to appear across the capacitor 182. The PNPN diode 167 is "off" (as are all other PNPN diodes except the diode 184), and no current flows through either of the resistors 165, or 183. Thus, the point 174 is at approximately the same voltage as bus 185, such as (+) 4 v., for example.

Figure 8:
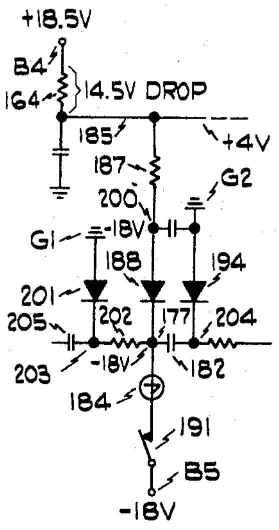
FIG. 8 shows one stage from the FIG. 7 circuit in an "on" condition.
Figure 9:
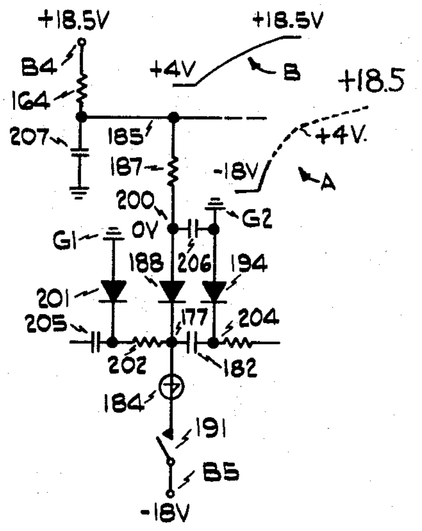
FIG. 9 shows the same stage in an "off" condition.

To understand how the ring counter advances in the prescribed direction, consider the operation shown by the two FIGURES 8, 9. Each of these figures shows selected parts of a switching stage which may be identified in FIG. 7 by comparing the reference numerals.

FIG. 8 shows the voltages when the diode 184 is conducting. The bus 185 stands at about (+) 4 volts and the points 177 and 200 stand at approximately (—) 18 volts. Current also flows from ground G1 through diode 201, resistor 202, point 177, diode 184, and switch 191 to battery B5. The point 203 is effectively clamped to ground. A similar circuit also clamps the point 204 to ground via diode 194. Since the points 177 and 204 stand at (—) 18 v. and 0 volts respectively, the capacitor 182 is effectively charged by 18 volts. There is no effective charge on the capacitor 205.

When the allotted circuit is taken into operation, it marks terminal 206', the switch 191 opens as shown in FIG. 9, and diode 184 switches "off." The ground potential G2 acts through the capacitor 206 to change the potential at point 200. Termination of the current through the resistor 164 changes the voltage on the bus 185 at a rate fixed by the charging characteristics of capacitor 207. The capacitor 206 is small relative to the capacitor 207 so that the voltage change at point 200 is fast relative to the voltage change on bus 185. Thus, as shown by Curve A, the potential at point 200 rises at a rapid rate to (+) 4 volts; then, this rate slows to the rise rate of the voltage on bus 185. However, the voltage at point 200 does not reach a steady state because, as it shoots up from (—) 18 volts toward (+) 4 volts, a PNPN diode fires. The firing voltage level is symbolically shown in Curve A by a change from a solid to a dotted line. As shown by Curve B, the voltage on bus 185 changes slowly to keep the PNPN diodes from firing on their rate effect.

When the voltage at point 177 changes to 0 volts (via the circuit comprising capacitor 206 and diode 188), the 18 volt charge on the right-hand side (as viewed in FIG. 9) of the capacitor 182 becomes a positive 18 volts relative to the 0 volts of the ground G2. This means that the point 174 (FIG. 7) receives a (+) 18 volt pulse at a time when the potential on the bus 185 is rising with the wave form B (FIG. 9). Since STAGE 1 is the only stage of the FIG. 7 ring counter which is now receiving such a (+) 18 volt pulse, the PNPN diode 167 in STAGE 1 switches "on" before any other PNPN diode may switch "on." Thus, the ring counter of FIG. 7 has advanced one step in the desired direction. It cannot advance in the reverse direction because the capacitor 205 is not charged when the switch 191 opens.

A circuit connected to the terminal 209 is now allotted. When it operates, it returns a mark at the terminal 210, the switch 169 opens, the ring counter of FIG. 7 takes another step, and the PNPN diode 211 turns "on."

Means are provided for improving the reliability of the FIG. 7 allotter. It is arranged to enable various circuits in a sequence which is such that no one circuit may be reassigned to serve a demand for service until after an effort has been made to assign at least a minimum number of other similar circuits. Thus, a single defective circuit may not be assigned and reassigned by the FIG. 7 circuit while other non-defective circuits stand uselessly idle. In greater detail, since the multi-step chain circuit 161 attenuates the (+) 18 volt control of an enabling marking signal which is sent from the point 204 to the point 174, each PNPN diode in the ring counter is primed to a different voltage. Thus, the potential of this enabling signal gives an order of choice according to the potential at each step in chain 161. That is, under the assumed conditions, the potentials at the points 174, 175, 176 may be 14 v., 10 v., 6 v., respectively, owing to the 4 volt voltage drops across each of the resistors 183, 181, 212. The potential across diode 167 is greater than the potential across any other diode in any other stage, and the circuit of STAGE 1 is allotted if the switch 169 is closed. If it is not closed, the circuit enabled by STAGE 1 is not available. The priming potential transmitted through the chain circuit 161 plus the potential on the bus 185 is now the highest at point 175, and the circuit of STAGE 2 is allotted. In like manner, the enable signal is always applied through the chain circuit 161 to prime and, therefore, enable a predetermined minimum number of circuits. Thus, each time that the allotter of FIG. 7 enables a call to seize control over a system, it enables a predetermined minimum number of circuits in a predetermined order of preference so that no one defective circuit can make the system inoperative.

While the principles of the invention have been described above in connection with specific apparatus and applications, it is to be understood that this description is made only by way of example and not as a limitation on the scope of the invention.

We claim:

1. An allotter comprising an endless cascade of switching stages, means for transferring a particular condition stage-by-stage around said cascade, a plurality of circuits, each of said circuits being individually associated with a corresponding stage of said allotter, means responsive to said particular condition for enabling the circuit individually associated with the stage which is then in said particular condition, logic circuit means coupled to monitor and analyze the outputs of said stages for detecting uncoordinated appearances of said particular condition, and means responsive to a detection of said uncoordinated appearances for indicating an allotter failure.

2. The allotter of claim 1 and means associated with said cascade of switching stages for preventing said particular condition from appearing and reappearing at one of said stages until an effort has been made to cause said particular condition to appear at a predetermined minimum number of other similar stages.

3. The allotter of claim 1 and means for preventing said allotter from enabling and re-enabling a defective one of said circuits while non-defective circuits stand uselessly idle.

4. An allotter comprising an endless cascade of switching stages, means for transferring a particular condition stage-by-stage around said cascade, a plurality of circuits, each of said circuits being individually associated with a corresponding stage of said allotter, means responsive to said particular condition for enabling the circuit individually associated with the stage which is then in said particular condition, logic circuit means coupled to monitor and analyze the outputs of said stages for detecting uncoordinated appearances of said particular condition, means responsive to a detection of said uncoordinated appearances for indicating an allotter failure, a multi-step chain circuit running through said switching stages, each step in said chain circuit being individually associated with a corresponding one of said cascaded stages, means for applying a control of enabling marking signal at a given step in said chain circuit, means for attenuating said marking signal at each succeeding step in said chain circuit, and means for enabling one of said stages to assume said particular condition in an order of preference which is fixed by the potentials at said steps.

5. An allotter comprising an endless cascade of switching stages, means for transferring a particular condition stage-by-stage around said cascade, a plurality of circuits, each of said circuits being individually associated with a corresponding stage of said allotter, means responsive to said particular condition for enabling the circuit individually associated with the stage which is then in said particular condition, logic circuit means coupled to monitor and analyze the outputs of said stages for detecting uncoordinated appearances of said particular condition, means responsive to a detection of said uncoordinated appearances for indicating an allotter failure, means for assigning a plurality of said circuits by groups to give service in a primary order, and means in the assigned one of said groups for assigning an individual one of the circuits in that group to provide a sub-order of service.

6. The allotter of claim 5 and at least a pair of control busses, one of said busses being common to all of said circuits, the other of said busses being individual to a group of said circuits, and a plurality of electronic breakdown devices connected across said busses, each of said devices being individually associated with a corresponding one of said circuits, whereby said devices breakdown responsive to a potential difference across said busses in a firing order established by variations of component characteristics, said firing order of said breakdown of devices establishing said sub-order assignment of said one circuit.

7. The allotter of claim 5 and means effective after a predetermined period of time for making a go, no-go decision, and means responsive to a no-go decision for canceling said sub-order assignment and returning the circuits, making a demand for service to a demanding condition.

8. An allotter comprising an identical pair of endless cascades of switching stages, means for normally enabling one of said cascades to operate and inhibiting another of said cascades to prevent it from operating, means for transferring a particular switching condition stage-by-stage around said cascade, means responsive to said particular condition for enabling a circuit individually associated with the stage which is then in said particular condition, means for monitoring and analyzing the outputs of said stages for detecting uncoordinated appearances of said particular condition, and means responsive to a detection of said uncoordinated appearances for indicating an allotter failure and enabling the operation of said other cascade while inhibiting said one cascade.

9. An allotter comprising an identical pair of endless cascades of switching stages, means for normally enabling one of said cascades to operate and inhibiting another of said cascades to prevent it from operating, means for transferring a particular switching condition stage-by-stage around said cascade, means responsive to said particular condition for enabling a circuit individually associated with the stage which is then in said particular condition, means for monitoring and analyzing the outputs of said stages for detecting uncoordinated appearances of said particular condition, means responsive to a detection of said uncoordinated appearances for indicating an allotter failure and enabling the operation of said other cascade while inhibiting said one cascade, said monitoring and analyzing means comprises a delay circuit coupled to a first of said cascaded stages, a two input AND circuit, one input of said AND circuit being coupled to the output of said delay circuit and the other input of said AND circuit being coupled to a succeeding one of said cascaded stages, said delay circuit causing an output signal at the time when said one stage provides an output signal during normal circuit operations, and means responsive to the output of said AND circuit for enabling said one cascade.

10. The allotter of claim 9 and means responsive to an absence of said output from said AND circuit for indicating said failure.

11. The allotter of claim 10 and means responsive to the output of said allotter for enabling various ones of said circuits in a sequence which is such that no one circuit may be twice enabled to serve a demand for service until after an effort has been made to enable a predetermined minimum number of other circuits.

12. The allotter of claim 11 wherein said last named means comprises means for enabling a plurality of circuits by groups to give service in a primary order, means in each enabled one of said groups for enabling the circuits in said group to provide a sub-order of service, and means effective after a predetermined period of time for enabling all of the circuits if no one circuit has then been assigned to give service.

13. The allotter of claim 12 and means effective after yet another predetermined period of time for making a go, no-go decision, means responsive to a no-go decision for canceling said demand for service and returning the circuits making said demand to a demanding condition.

14. An allotter comprising an endless cascade of switching stages, means for transferring a particular condition stage-by-stage around said cascade, a plurality of circuits, each of said circuits being individually associated with a corresponding stage of said allotter, means responsive to said particular condition for enabling the circuit individually associated with the stage which is then in said particular condition, and means associated with said cascade of switching stages for preventing said particular condition from appearing and reappearing at one of said stages until an effort has been made to cause said particular condition to appear at a predetermined minimum number of other similar stages.

15. An allotter comprising an endless cascade of switching stages, means for transferring a particular condition stage-by-stage around said cascade, a plurality of circuits, each of said circuits being individually associated with a corresponding stage of said allotter, means responsive to said particular condition for enabling the circuit individually associated with the stage which is then in said particular condition, means associated with said cascade of switch-stages for preventing said particular condition from appearing and reappearing at one of said stages until an effort has been made to cause said particular condition to appear at a predetermined minimum number of other similar stages, means for assigning a plurality of said circuits by groups to give service in a primary order, and means in the assigned one of said groups for assigning an individual one of the circuits in that group to provide a sub-order of service.

16. The allotter of claim 15, and at least a pair of control busses, one of said busses being common to all of said circuits, the other of said busses being individual to a group of said circuits, and a plurality of electronic breakdown devices connected across said busses, each of said devices being individually associated with a corresponding one of said circuits, whereby said devices breakdown responsive to a potential difference across said busses in a firing order established by variations of component characteristics, said firing order of said breakdown devices establishing said sub-order assignment of said one circuit.

17. An allotter comprising at least a pair of control busses, one of said busses being normally energized and common to all of a plurality of circuits, the other of said busses being normally deenergized and individual to a group of said circuits, a plurality of electronic breakdown devices connected across said busses, each of said devices being individually associated with a corresponding one of said circuits, whereby said devices breakdown responsive to a potential difference across said busses in a firing order established by variations of component characteristics, means for energizing the bus which is individual to said group for assigning said group of said circuits to give service, and means responsive to the resulting breakdown of one of said devices in the assigned group for assigning an individual one of the circuits in that group to provide service.

References Cited

UNITED STATES PATENTS

| | | | |
|---|---|---|---|
| 3,021,450 | 2/1962 | Jiu | 328—43 |
| 3,135,875 | 6/1964 | Leighter | 328—43 |
| 3,234,534 | 2/1966 | Todman | 307—88.5 |

KATHLEEN H. CLAFFY, *Primary Examiner.*

L. A. WRIGHT, *Assistant Examiner.*